United States Patent Office 3,087,942
Patented Apr. 30, 1963

---

3,087,942
PREPARATION OF ANABOLIC AGENTS
Klaus Brückner, Klaus Irmscher, and Josef Gillissen, Darmstadt, Germany, assignors to E. Merck Aktiengesellschaft, Darmstadt, Germany
No Drawing. Filed Oct. 25, 1961, Ser. No. 147,469
Claims priority, application Germany Oct. 29, 1960
4 Claims. (Cl. 260—397.4)

This invention relates to the preparation of novel steroid compounds having a high anabolic activity and a low androgenic activity.

An anabolic agent, sometimes called a myotrephic agent, promotes storage of protein and generally stimulates tissues. These agents are useful for the treatment of persons debilitated by various metabolic and endocrine disorders. Unfortunately, though, anabolic agents usually also exhibit a significant androgenic effect, and, therefore, debilitated females cannot be treated with these anabolic agents without the danger of imparting masculine characteristics to the females.

A classical example of an anabolic agent having an excessive androgenic activity is the compound testosterone.

A great deal of effort has been expended to upgrade the anabolic-androgenic activity of testosterone, but usually with no outstanding success. For example, in a paper by R. M. Dodson and Robert C. Tweit, in the Journal of the American Chemical Society, volume 81, pages 12–24 (1959), there is reported a modification of testosterone by the introduction of a 7- as well as a 1-acetylthio group into both testosterone, the 17-ester thereof, and 4-androstene-3,17-dione. These 7- and 1-acetylthio derivatives were tested and the results indicated a decrease in both the androgenic and anabolic activities of these steroids. In contrast to these results, it is to be appreciated that modified testosterones are sought which exhibit a decreased androgenic activity, but simultaneously either maintaining or increasing the anabolic activity.

The object of this invention, therefore, is to provide new steroid compounds having a high anabolic activity and a low androgenic activity.

Upon further study of the specification and appended claims, other advantages and objects of the present invention will become apparent.

To attain the objects of this invention, it has been unexpectedly discovered that by the incorporation of an acetylthio group in the 7α or 1α positions, or both, in 17α-methyl-testosterones, there are obtained steroids which exhibit a high anabolic effect and a low androgenic effect. These novel derivatives, capable of oral administration, exhibit an increased anabolic effect and a substantially reduced androgenic effect, as compared to the unsubstituted 17α-methyl-testosterone.

These excellent physiological properties of the new derivatives are quite surprising in view of the aforementioned Dodson and Tweit paper which teaches that the introduction of a 7- and 1-acetylthio group into testosterone and the 17-esters thereof, result in a decrease in the anabolic effect of the parent compound. This invention, on the other hand, teaches that there is an increase in the anabolic effect when the 7α- and 1α-acetylthio groups are introduced into the 17α-methyl-testosterones.

Furthermore, it was discovered that upon the introduction of the 7α- and 1α-acetylthio groups to the 16-methylene derivatives of 17α-methyl-testosterones an even further reduction in the androgenic effect is obtained, while the anabolic effect is maintained constant, as compared to the corresponding substitution product which does not have a 16-methylene group.

The novel compounds of this invention conform to the following structural generic formula:

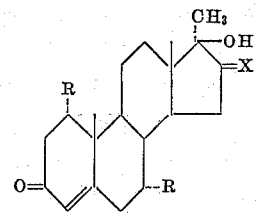

wherein R is selected from the group consisting of: $CH_3-CO-S-$ and hydrogen, and wherein at least one R represents $CH_3-CO-S-$; and wherein X is selected from the group consisting of: H,H and methylene.

As typical examples of the novel steroids of this invention, there are included:

7α-acetylthio-17α-methyl-testosterone
1α-acetylthio-17α-methyl-testosterone
1α,7α-di-acetylthio-17α-methyl-testosterone
7α-acetylthio-16-methylene-17α-methyl-testosterone
1α-acetylthio-16-methylene-17α-methyl-testosterone
1α,7α-di-acetylthio-16-methylene-17α-methyl-testosterone To demonstrate the improved anabolic-androgenic ratios of the compound of this invention, reference is made to the following table, wherein the anabolic-androgenic ratios of the 7α- and 1α-acetylthio substitution products are compared to the same compound devoid of the acetylthio groups:

| Compound | Ratio of anabolic/androgenic activity |
|---|---|
| methyl-testosterone | 1 |
| 7α-acetylthio-17α-methyl-testosterone | 3.71 |
| 1α,7α-di-acetylthio-17α-methyl-testosterone | 4.55 |
| 1α-acetylthio-16-methylene-17α-methyl-testosterone | 4.14 |
| 1α-acetylthio-17α-methyl-testosterone | 1.86 |

The anabolic-androgenic ratios thus obtained are compared to the well known anabolic compound methyl-testosterone, the ratio of which is 1. The trials were conducted according to the commonly used method of Hershberger et al. described in proceedings of the Society for Experimental Biology and Medicine, vol. 83, page 175 (1953), the dose being 1 or 10 mg. per animal.

The novel compounds of this invention are particularly efficacious anabolic agents which can be administered perorally, preferably in 5 mg. doses. These drugs may be manufactured in the form of tablets, pills, dragees, solutions or emulsions with the aid of the usual pharmaceutical auxiliary agents and excipients. The preferred concentration of the solutions is 1 mg./cc.

The novel compounds of this invention can be produced by conventional methods from 17α-methyl-testosterone derivatives which are unsaturated in the 1,2- and/or the 6,7-positions. These aforesaid raw materials are reacted with thioacetic acid under conventional conditions. Preferably it is advantageous to conduct the reaction in contact with ultra-violet radiation, and in the presence of an inert solvent, such as benzene, dioxane, toluene, carbon tetrachloride, etc.

It is to be appreciated that the foregoing brief description of the method of producing the novel steroids of this invention is adequate to teach a steroid chemist skilled in the art how to produce the novel compounds of this invention.

The following examples, therefore, are merely preferred specific embodiments of this invention, and are not intended to be limitative of the specification and appended claims.

Example 1

7 g. 6-dehydro-17α-methyl-testosterone are heated in 20 ml. thioacetic acid on a steam bath for 1.5 hours. The thioacetic acid is thereafter extracted by vacuum and the residue is crystallized from methanol. The 7α-acetylthio-17α-methyl-testosterone melts at 162–163° C.; $\lambda_{max}$238 m$\mu$, $E_{1\,cm.}^{1\%}$ 500; $(\alpha)_D$ —69.3° C.

Example 2

4 g. 17α-methyl-1,4,6-androstatriene-17β-ol-3-one are boiled in 12 ml. thioacetic acid under reflux for 1½ hours. This reaction mixture is thereafter concentrated in vacuum to dryness and the 1α,7α-di-acetylthio-17α-methyl-testosterone is crystallized from the residue after treatment with methanol; melting point 202–204° C.; $(\alpha)_D$—74.6° C. (dioxane); $\lambda_{max}$237.5 m$\mu$, $E_{1\,cm.}^{1\%}$ 449

Example 3

2.9 g. 1-dehydro-17α-methyl-testosterone are dissolved in 10 ml. thioacetic acid and are boiled under reflux for 1.5 hours. The reaction composition is thereafter concentrated in vacuum and the residue is crystallized from ether. The obtained 1α-acetylthio-17α-methyl-testosterone melts at 160–161° C.; $(\alpha)_D$+98° (Chlf.); $\lambda_{max}$240 m$\mu$, $E_{1\,cm.}^{1\%}$ 426

Example 4

3.25 g. 1-dehydro-16-methylene-17α-methyl-testosterone are boiled in 15 ml. thioacetic acid under reflux for 1¼ hours. The solution is thereafter concentrated in vacuum, the residue is crystallized from ether/petroleum ether, and the 1-acetylthio-16-methylene-17α-methyl-testosterone is purified by recrystallization from ether. The melting point is 154–155° C. The product melts after further recrystallization at 157–160° C.; $(\alpha_D$+30° C. (dioxane); $\lambda_{max}$240 m$\mu$, $E_{1\,cm.}^{1\%}$ 450

Example 5

According to Example 1, the 7α-acetylthio-16-methylene-17α-methyl-testosterone is produced from 6-dehydro-16-methylene-17α-methyl-testosterone. Melting point 147–149° C.; $\lambda_{max}$ 238 m$\mu$, $E_{1\,cm.}^{1\%}$ 500; $(\alpha)_D$—149.3° (dioxane)

Example 6

According to Example 2, the 1α,7α-di-acetylthio-16-methylene-17α-methyl-testosterone is produced from 16-methylene-17α-methyl-1,4,6-androstatriene-3-one-17β-ol. Melting point 194–196° C.; $\lambda_{max}$238 m$\mu$, $E_{1\,cm.}^{1\%}$ 421

From the foregoing description, one skilled in the art can readily appreciate the essential characteristics of this invention, and without departing from the spirit and scope of these essential characteristics, one can modify and adapt this invention into varying usages and conditions. Consequently, such modifications and adaptations should, and are intended to be, within the full range of equivalents of the following claims.

What we claim is:
1. 1α,7α-di-acetylthio-17α-methyl-testosterone.
2. 7α-acetylthio-16-methylene-17α-methyl-testosterone.
3. 1α-acetylthio-16-methylene-17α-methyl-testosterone.
4. 1α,7α-di-acetylthio-16-methylene-17α-methyl-testosterone.

References Cited in the file of this patent

UNITED STATES PATENTS

| | | |
|---|---|---|
| 2,859,222 | Dodson et al. | Nov. 4, 1958 |
| 2,875,215 | Dodson et al. | Feb. 24, 1959 |
| 2,929,763 | Wettstein et al. | Mar. 22, 1960 |

OTHER REFERENCES

Iriarte et al.: 81 J.A.C.S. 436–438 (1959).